(12) United States Patent
Kim

(10) Patent No.: US 10,112,489 B2
(45) Date of Patent: Oct. 30, 2018

(54) METHOD OF CONTROLLING REGENERATIVE BRAKING COOPERATION FOR ELECTRIC VEHICLE

(71) Applicant: Hyundai Motor Company, Seoul (KR)

(72) Inventor: Sung Do Kim, Seoul (KR)

(73) Assignee: Hyundai Motor Company, Seoul (KR)

(*) Notice: Subject to any disclaimer, the term of this patent is extended or adjusted under 35 U.S.C. 154(b) by 25 days.

(21) Appl. No.: 15/276,636

(22) Filed: Sep. 26, 2016

(65) Prior Publication Data
US 2017/0259671 A1    Sep. 14, 2017

(30) Foreign Application Priority Data

Mar. 8, 2016   (KR) .................. 10-2016-0027451

(51) Int. Cl.

| | | |
|---|---|---|
| *B60T 17/00* | (2006.01) | |
| *B60W 20/00* | (2016.01) | |
| *F16D 65/00* | (2006.01) | |
| *B60L 7/26* | (2006.01) | |
| *B60T 7/04* | (2006.01) | |
| *B60T 17/22* | (2006.01) | |
| *B60T 1/10* | (2006.01) | |

(Continued)

(52) U.S. Cl.
CPC .............. *B60L 7/26* (2013.01); *B60L 15/2009* (2013.01); *B60T 1/10* (2013.01); *B60T 7/042* (2013.01); *B60T 13/586* (2013.01); *B60T 17/221* (2013.01); *B60L 2250/26* (2013.01); *B60T 2270/604* (2013.01); *Y02T 10/7258* (2013.01)

(58) Field of Classification Search
None
See application file for complete search history.

(56) References Cited

U.S. PATENT DOCUMENTS

| 2013/0076113 A1 | 3/2013 | Pihl et al. | |
|---|---|---|---|
| 2014/0229045 A1* | 8/2014 | Borchers .................. | B60T 1/10 701/22 |

FOREIGN PATENT DOCUMENTS

| JP | 2006-103630 | 4/2006 |
|---|---|---|
| KR | 10-2007-0059556 A | 6/2007 |
| KR | 10-2008-0024603 A | 3/2008 |

(Continued)

*Primary Examiner* — Adam D Tissot
(74) *Attorney, Agent, or Firm* — Morgan, Lewis & Bockius LLP

(57) ABSTRACT

A method of controlling a regenerative braking cooperation for an electric vehicle may include a entering a correction mode when a braking quantity of a driver is detected by a pedal stroke sensor, a first braking pattern analyzing operation, of comparing an accumulated correction hydraulic pressure braking quantity with a predetermined first hydraulic pressure braking quantity, a regenerative braking restriction requesting operation of, when the accumulated correction hydraulic pressure braking quantity is smaller than the first hydraulic pressure braking quantity, determining, that the driver has a gradual braking-centered braking pattern and transferring a signal for requesting a regenerative braking restriction of a motor to a controller, and a hydraulic pressure braking operation, of determining a correction hydraulic pressure braking quantity based on a braking quantity of the driver input into the stroke sensor in a state where regenerative braking of the motor is restricted, and performing a hydraulic pressure braking.

7 Claims, 6 Drawing Sheets

(51) Int. Cl.
*B60L 15/20* (2006.01)
*B60T 13/58* (2006.01)

(56) References Cited

FOREIGN PATENT DOCUMENTS

| | | |
|---|---|---|
| KR | 10-2008-0037220 A | 4/2008 |
| KR | 10-2010-0032518 A | 3/2010 |
| KR | 10-2011-0139836 A | 12/2011 |
| KR | 10-2012-0055422 A | 5/2012 |
| KR | 10-2014-0002808 A | 1/2014 |

* cited by examiner

METHOD OF CONTROLLING REGENERATIVE BRAKING COOPERATION FOR ELECTRIC VEHICLE

CROSS-REFERENCE TO RELATED APPLICATION

The present application claims priority to Korean Patent Application No. 10-2016-0027451, filed Mar. 8, 2016, the entire contents of which is incorporated herein for all purposes by this reference.

BACKGROUND OF THE INVENTION

Field of the Invention

The present invention relates to a method of controlling a regenerative braking cooperation for an electric vehicle. More particularly, it relates to a method of controlling a regenerative braking cooperation for an electric vehicle, which is capable of removing rust of a disk through friction of the disk and a pad while the electric vehicle brakes by appropriately controlling regenerative braking in an electric vehicle.

Description of Related Art

In general, an electric vehicle, such as a hybrid vehicle, a fuel cell vehicle, and a hydrogen fuel cell vehicle, is a vehicle manufactured by gathering only advantages of an electric vehicle, which has no exhaust gas and has high efficiency, but has a short travelling distance, and a small internal combustion engine, which has a high output and has a long travelling distance, but has low efficiency and discharges harmful materials.

Accordingly, the electric vehicle includes an engine generating power by using a combustion reaction of fuel, and an electric motor generating driving force of a wheel by electric power supplied from the engine or a battery, and the electric vehicle adopts a regenerative braking method for improving fuel efficiency.

The regenerative braking system uses part of the braking force for generating power while the vehicle brakes, charges generated electric energy in the battery, and uses part of the kinetic energy by a travelling speed of the vehicle as energy required for driving a power generator.

Accordingly, the regenerative braking system may decrease kinetic energy and generate electric energy, and may increase a travelling distance of the vehicle and improve fuel efficiency, and may decrease a discharge of harmful gas.

However, the regenerative braking system collects energy by minimizing a general hydraulic pressure braking through an organic cooperation of the regenerative braking of the motor and the hydraulic pressure brake, and normal driving conditions of most of the drivers are a gradual braking-centered pattern, in which deceleration is small, and a case where there is no or small rate of a general hydraulic pressure braking occurs, and in this case, a surface correction of the disk and the pad performed through the hydraulic pressure braking may not be properly performed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a regenerative braking cooperation for an electric vehicle, which is capable of removing rust of a disk surface through friction of a disk and a pad while the electric vehicle brakes, and stabilizing a frictional coefficient of the pad by analyzing a braking pattern of a driver and adjusting a ratio of a regenerative braking quantity and a hydraulic pressure braking quantity.

According to various aspects of the present invention, a method of controlling a regenerative braking cooperation for an electric vehicle may include a correction mode entering operation, of entering a correction mode when a braking quantity of a driver is detected by a pedal stroke sensor of the vehicle, a first braking pattern analyzing operation, by a controller, of comparing an accumulated correction hydraulic pressure braking quantity with a predetermined first hydraulic pressure braking quantity, in order to analyze a braking pattern of the driver through the entering to the correction mode, a regenerative braking restriction requesting operation of, when the accumulated correction hydraulic pressure braking quantity is smaller than the first hydraulic pressure braking quantity, determining, by the pedal stroke sensor, that the driver has a gradual braking-centered braking pattern and transferring a signal for requesting a regenerative braking restriction of a motor to the controller, and a hydraulic pressure braking operation, by the controller, of calculating a correction hydraulic pressure braking quantity based on a braking quantity of the driver input into the pedal stroke sensor in a state where regenerative braking of the motor is restricted, and performing a hydraulic pressure braking according to the correction hydraulic pressure braking quantity.

The accumulated correction hydraulic pressure braking quantity may be a hydraulic pressure braking quantity under a braking condition, in which the regenerative braking of the motor is restricted and only the hydraulic pressure braking is performed.

The first braking pattern analyzing operation may include a total required braking quantity calculating operation, by the controller, in which when the accumulated correction hydraulic pressure braking quantity is larger than the first hydraulic pressure braking quantity, it is determined that the driver has a normal braking pattern, and the accumulated correction hydraulic pressure braking quantity according to a travelling distance is initialized, an operation mode of the vehicle enters a general mode, and a total required braking quantity is calculated.

The method may further include a regenerative braking allowance quantity receiving operation, by the controller, of receiving an allowance quantity according to a requested quantity of the regenerative braking of the motor in order to calculate the total required braking quantity in the general mode, in which in the general mode, the hydraulic pressure braking may be performed based on the total required braking quantity calculated based on a sum of the requested quantity of the regenerative braking of the motor and a general hydraulic pressure braking quantity detected according to a braking quantity.

The total required braking quantity calculating operation may include a second braking pattern analyzing operation, by the controller, in which when it is determined that a traveling distance of the vehicle in a state where the total required braking quantity is calculated is equal to or larger than a predetermined distance, an accumulated general hydraulic pressure braking quantity according to the travelling distance equal to or larger than the predetermined distance is compared with a predetermined second hydraulic pressure braking quantity.

The accumulated general hydraulic pressure braking quantity may be a hydraulic pressure braking quantity under a braking condition, in which the regenerative braking of the motor and the hydraulic pressure braking are performed together.

In the second braking pattern analyzing operation, when the accumulated general hydraulic pressure braking quantity is larger than the second hydraulic pressure braking quantity, it may be determined that the driver has a gradual braking-centered braking pattern, and the regenerative braking restriction requesting operation and the hydraulic pressure braking operation may be sequentially performed.

In the second braking pattern analyzing operation, when the accumulated general hydraulic pressure braking quantity is smaller than the predetermined second hydraulic pressure braking quantity, it may be determined that the driver has the normal braking pattern and the operation mode of the vehicle may enter the general mode.

According to various embodiments of the present invention, it is possible to remove rust from the surface of the disk through the friction between the disk and the pad while the vehicle brakes by analyzing a braking pattern of a driver and adjusting a ratio of the regenerative braking quantity and the hydraulic pressure braking quantity, and to stabilize a frictional coefficient of the pad.

According to various embodiments of the present invention, it is possible to correct a change in a torque of the brake and a change in a thickness of the disk, so that it is possible to solve a dissatisfaction matter of the driver, such as a brake judder and squeal noise, caused by a problem of the surfaces of the disk and the pad.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
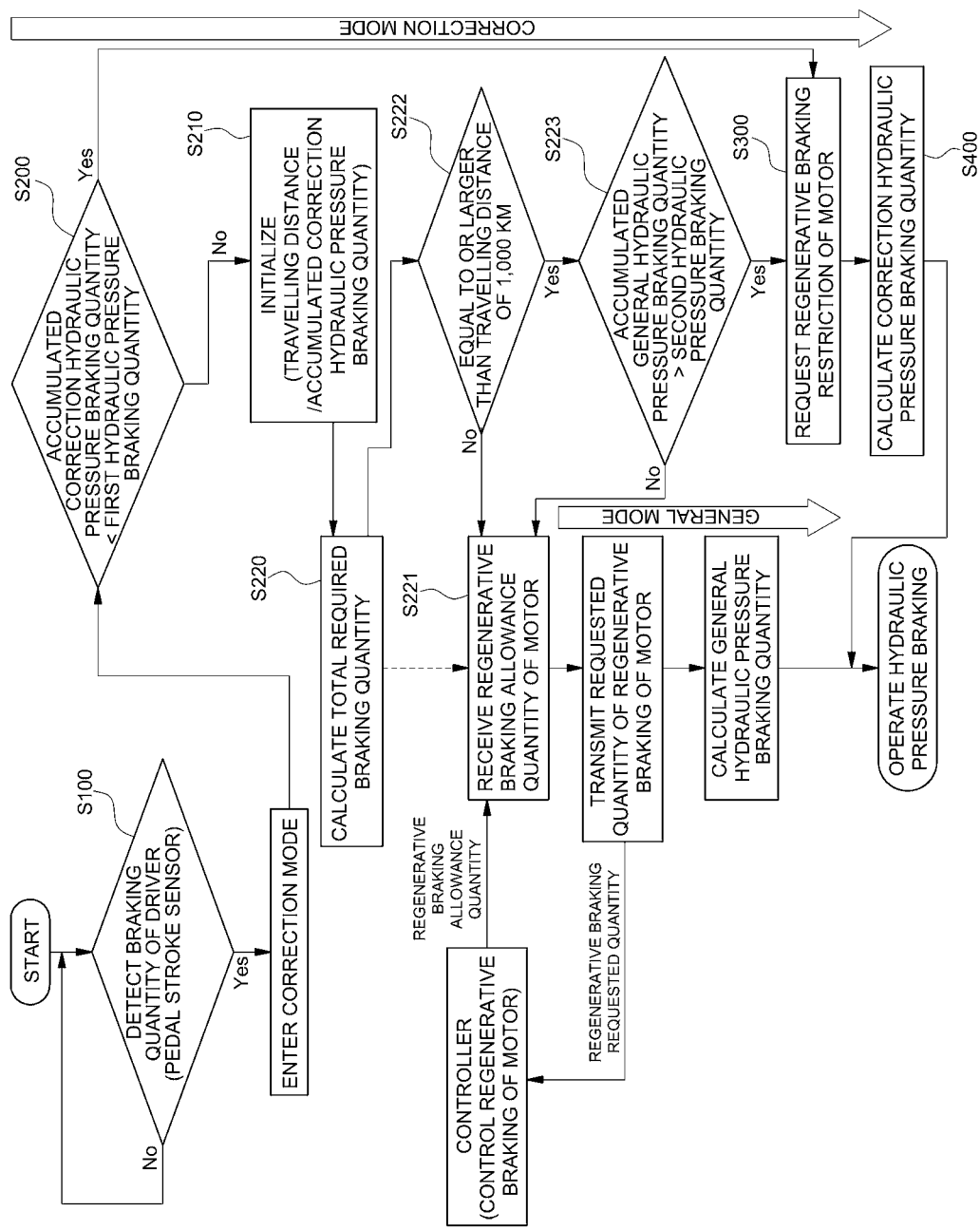
FIG. 1 is a flowchart sequentially illustrating a method of controlling a regenerative braking cooperation for an electric vehicle according to various embodiments of the present invention.
Figure 2:
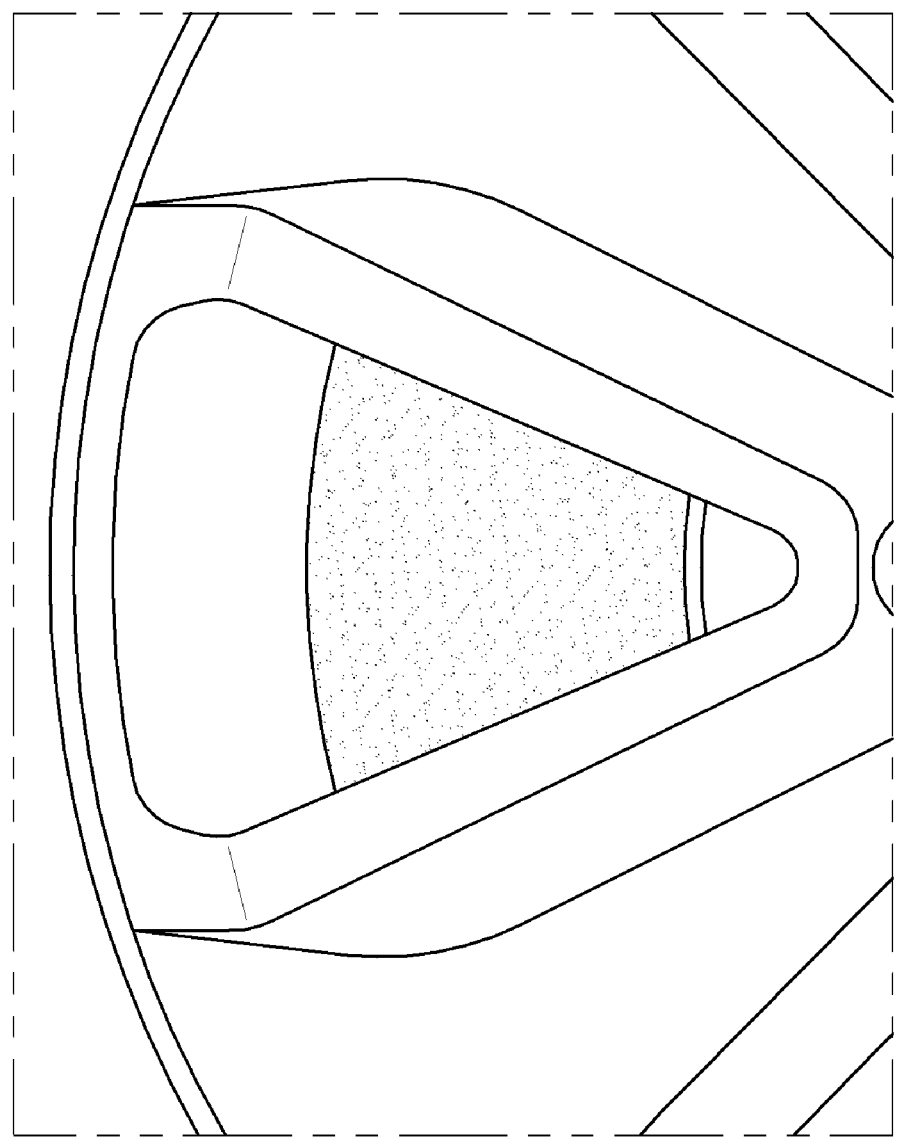
FIG. 2 is an image illustrating a generation of rust on a disk surface in the method of controlling the regenerative braking cooperation for the electric vehicle according to various embodiments of the present invention.

FIG. 1 is a flowchart sequentially illustrating a method of controlling a regenerative braking cooperation for an electric vehicle according to various embodiments of the present invention, and FIG. 2 is an image illustrating a generation of rust on a disk surface in the method of controlling the regenerative braking cooperation for the electric vehicle according to various embodiments of the present invention.

Figure 3:
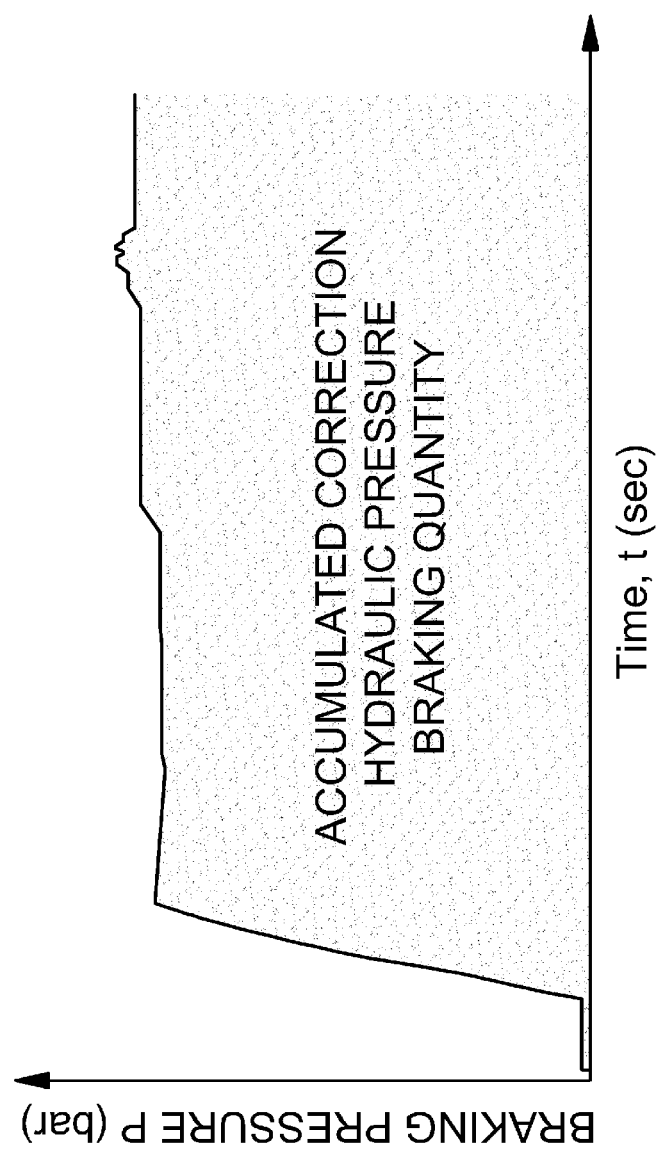
FIG. 3 is a graph illustrating an accumulated correction hydraulic pressure braking quantity in the method for controlling the regenerative braking cooperation for the electric vehicle according to various embodiments of the present invention.
Figure 4:
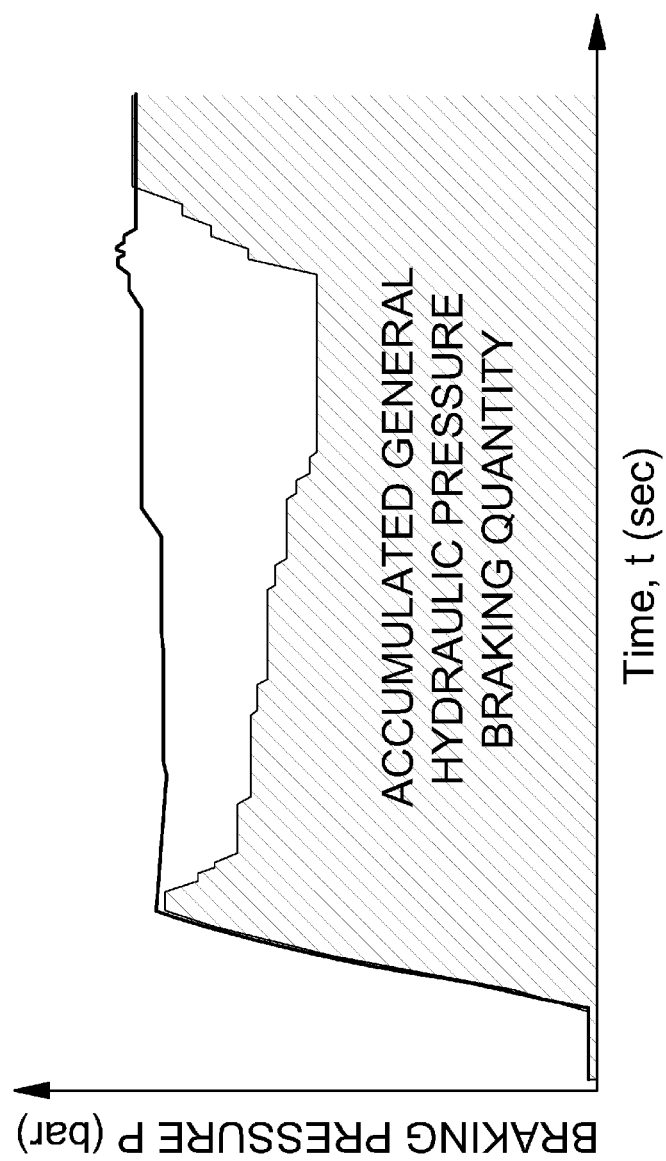
FIG. 4 is a graph illustrating an accumulated general hydraulic pressure braking quantity in the method for controlling the regenerative braking cooperation for the electric vehicle according to various embodiments of the present invention.

FIG. 3 is a graph illustrating an accumulated correction hydraulic pressure braking quantity in the method for controlling the regenerative braking cooperation for the electric vehicle according to various embodiments of the present invention, and FIG. 4 is a graph illustrating an accumulated general hydraulic pressure braking quantity in the method for controlling the regenerative braking cooperation for the electric vehicle according to various embodiments of the present invention.

Figure 5:
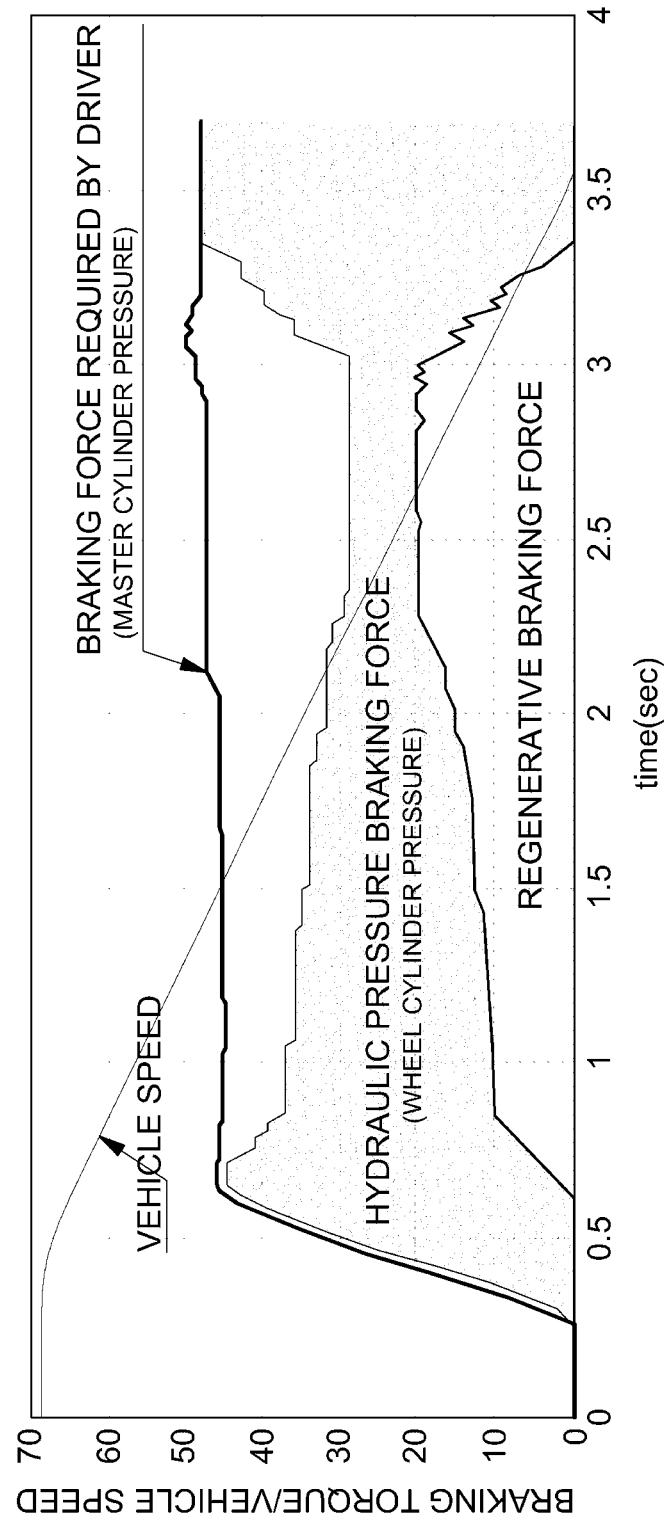
FIG. 5 is a graph illustrating an adjustment of a regenerative braking quantity in the method for controlling the regenerative braking cooperation for the electric vehicle according to various embodiments of the present invention.
Figure 6:
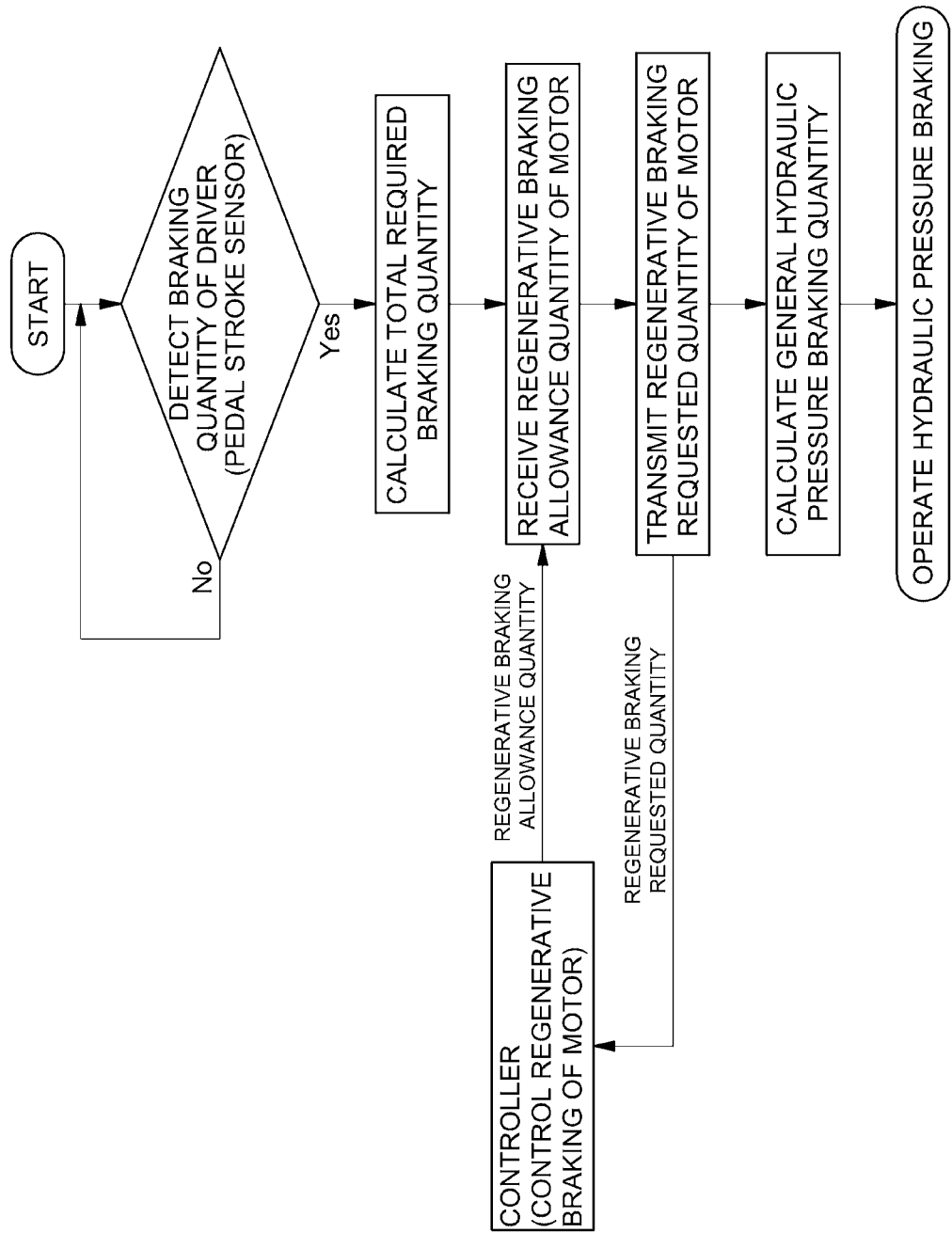
FIG. 6 is a diagram illustrating a general mode in the method of controlling the regenerative braking cooperation for the electric vehicle according to various embodiments of the present invention.

FIG. 5 is a graph illustrating an adjustment of a regenerative braking quantity in the method for controlling the regenerative braking cooperation for the electric vehicle according to various embodiments of the present invention, and FIG. 6 is a diagram illustrating a general mode in the method of controlling the regenerative braking cooperation for the electric vehicle according to various embodiments of the present invention.

As illustrated in FIG. 1, the method of controlling the regenerative braking cooperation for the electric vehicle according to various embodiments of the present invention will be sequentially described below.

First, when a braking quantity of a driver according to a braking pressure is detected from a pedal stroke sensor of a vehicle, an operation mode enters a correction mode (S100).

That is, when the braking quantity of the driver is detected as described above, the operation mode enters the correction mode in order to determine whether a braking pattern of the driver is a braking using the relatively large quantity of hydraulic braking force or a braking continuously increasing regenerative braking force of a motor for improving fuel efficiency by using the braking pressure according to the braking quantity.

That is, in a case of a vehicle performing a fuel-efficiency centered gradual braking (weak braking), since the hydraulic pressure braking quantity is decreased, a surface correction operation of a disk and a pad is insufficient, and thus it is difficult to remove rust generated on the disk as illustrated in FIG. 2, and a correction of a disk thickness change and a brake torque change is not performed, and thus a brake judder is generated.

To this end, after entering the correction mode (S100), an accumulated correction hydraulic pressure braking quantity is compared with a predetermined first hydraulic pressure braking quantity, by a controller, in order to analyze the braking pattern of the driver (S200).

In this case, the accumulated correction hydraulic pressure braking quantity refers to a hydraulic pressure braking quantity under a braking condition, in which a regenerative braking of the motor is restricted and only the hydraulic pressure braking is allowed, that is, an entire region of the accumulated correction hydraulic pressure braking quantity formed by integrating the braking pressure by time in FIG. 3.

When the accumulated correction hydraulic pressure braking quantity is smaller than the predetermined first hydraulic pressure braking quantity as a result of the first braking pattern analyzing operation (S200), it is determined that the driver has a gradual braking-centered braking pattern, and a signal for requesting a regenerative braking restriction of the motor is transmitted to the controller controlling the regenerative braking of the motor (S300).

As described above, when the accumulated correction hydraulic pressure braking quantity is smaller than the predetermined first hydraulic pressure braking quantity, it may be determined that the braking pressure is decreased as much as the small quantity, so that it is possible to predict that the driver performs the gradual braking-centered braking.

In this case, since the correction operation of the disk and the pad surface may be insufficient by the gradual braking, a correction hydraulic pressure braking quantity is calculated based on a braking quantity of the driver input into the stroke sensor in a state where the regenerative braking of the motor is limited by requesting the regenerative braking restriction signal (S300), and the hydraulic pressure braking is performed according to the correction hydraulic pressure braking quantity (S400).

Accordingly, in the method of controlling the regenerative braking cooperation for the electric vehicle according to various embodiments of the present invention, when it is determined that the driver has the gradual braking-centered braking as the braking pattern, the regenerative braking is restricted and simultaneously only the hydraulic pressure braking is allowed according to the correction hydraulic pressure braking quantity, so that it is possible to prevent a dissatisfaction of the driver due to a defect in a rust removal from the disk surface by adjusting a ratio of the regenerative braking quantity and the hydraulic pressure braking quantity as illustrated in FIG. 5.

In the meantime, when the accumulated correction hydraulic pressure braking quantity is larger than the first hydraulic pressure braking quantity by analyzing the braking pattern of the driver through the first braking pattern analyzing operation (S200), it is determined that the driver has a normal braking pattern and the accumulated correction hydraulic pressure braking quantity according to a travelling distance is initialized (S210).

In this case, when the accumulated correction hydraulic pressure braking quantity according to the travelling distance is initialized according to the determination that the driver has the normal braking pattern, the operation mode enters a general mode, not the correction mode, and a total required braking quantity is calculated by using a requested quantity of a regenerative braking of the motor and a general hydraulic pressure braking quantity (S220).

In the calculation of the total required braking quantity (S220), a regenerative braking allowance quantity of the motor transmitted according to the requested quantity of the regenerative braking of the motor is received from the controller so that the total required braking quantity is calculated according to the entrance to the general mode (S221).

Here, in the general mode, the hydraulic pressure braking including the requested quantity of the regenerative braking is performed through the total required braking quantity calculated based on a sum of the requested quantity of the regenerative braking of the motor and the general hydraulic pressure braking quantity detected according to the braking quantity of the vehicle as illustrated in FIG. 6.

In the calculation operation (S220) of the total required braking quantity, when the travelling distance of the vehicle in the state where the total required braking quantity is calculated is equal to or larger than a predetermined distance (S222), a second braking pattern analyzing operation (S223), in which an accumulated general hydraulic pressure braking quantity according to the travelling distance is compared with a predetermined second hydraulic pressure braking quantity, is performed.

In the present exemplary embodiment, it is set that the travelling distance of the vehicle is 1,000 km, but this is only illustrative, and the travelling distance may be changed as necessary.

The accumulated general hydraulic pressure braking quantity in the second braking pattern analyzing operation (S223) refers to a hydraulic pressure braking quantity under the braking condition, in which the regenerative braking of the motor and the hydraulic pressure braking are performed together, that is, an entire region of the accumulated general hydraulic pressure braking quantity formed by integrating the braking pressure with time in a state where the regenerative braking region is excluded in FIG. 4.

When the accumulated general hydraulic pressure braking quantity is larger than the second hydraulic pressure braking quantity as a result of the comparison in the second braking pattern analyzing operation (S223), it is determined that the driver has the gradual braking-centered braking pattern, so that a regenerative braking restriction requesting operation S300 and a hydraulic pressure braking operation (S400) are sequentially performed.

That is, the case where the accumulated general hydraulic pressure braking quantity under the condition, in which the regenerative braking of the motor and the hydraulic pressure braking are performed together, is larger than the predetermined second hydraulic pressure braking quantity refers to a case where the regenerative braking quantity is relatively larger than the hydraulic pressure braking quantity by the gradual braking-centered braking pattern of the driver, so that the regenerative braking of the motor needs to be restricted.

Accordingly, the signal for requesting the regenerative braking restriction of the motor is transferred to the controller and simultaneously, the hydraulic pressure braking is performed according to the correction hydraulic pressure braking quantity, so that it is possible to brake the vehicle only through the hydraulic pressure braking according to the correction hydraulic pressure braking quantity in a state where the regenerative braking of the motor is restricted.

Furthermore, it is possible to prevent a dissatisfaction of the driver due to a defect in a rust removal from the disk surface by adjusting a ratio of the regenerative braking quantity and the hydraulic pressure braking quantity, and correct a change in a torque of the brake and a change in a thickness of the disk, thereby solving a dissatisfaction matter of the driver, such as a brake judder and squeal noise, caused by a problem of the surfaces of the brake disk and the brake pad.

In the meantime, when the accumulated general hydraulic pressure braking quantity is smaller than the second hydraulic pressure braking quantity in the second braking pattern analyzing operation (S223), it is determined that the driver has the normal braking pattern, and then a regenerative braking allowance quantity receiving operation S221 is entered, and an allowance quantity according to the requested quantity of the regenerative braking of the motor is received, so that the hydraulic pressure braking is performed by the general mode.

That is, the case where the accumulated general hydraulic pressure braking quantity is smaller than the second hydraulic pressure braking quantity refers to a case where the driver brakes the vehicle with the normal braking pattern, which does not require the adjustment of the ratio of the regenerative braking quantity and the hydraulic pressure braking quantity, so that the hydraulic pressure braking is performed according to the total required braking quantity calculated through the total required braking quantity calculating operation (S220).

The present invention has an effect of removing rust from the surface of the disk which is produced through the friction between the brake disk and the brake pad while the vehicle brakes by analyzing a braking pattern of a driver and adjusting a ratio of the regenerative braking quantity and the hydraulic pressure braking quantity, and stabilizing a frictional coefficient of the brake pad.

The present invention may correct a change in a torque of the brake and a change in a thickness of the disk, thereby having an effect of solving a dissatisfaction matter of the driver, such as a brake judder and squeal noise, caused by a problem of the surfaces of the brake disk and the brake pad.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a regenerative braking cooperation for an electric vehicle, the method comprising:
   a correction mode entering operation, of entering a correction mode when a braking quantity of a driver is detected by a pedal stroke sensor of the vehicle;
   a first braking pattern analyzing operation, by a controller, of comparing an accumulated correction hydraulic pressure braking quantity with a predetermined first hydraulic pressure braking quantity, to analyze a braking pattern of the driver through the entering to the correction mode, the first braking pattern analyzing operation including a total required braking quantity determining operation;
   a regenerative braking restriction requesting operation of, when the accumulated correction hydraulic pressure braking quantity is smaller than the first hydraulic pressure braking quantity, determining, by the pedal stroke sensor, that the driver has a gradual braking-centered braking pattern and transferring a signal for requesting a regenerative braking restriction of a motor to the controller; and
   a hydraulic pressure braking operation, by the controller, of determining a correction hydraulic pressure braking quantity based on a braking quantity of the driver input into the pedal stroke sensor in a state where regenerative braking of the motor is restricted, and performing a hydraulic pressure braking according to the correction hydraulic pressure braking quantity,
   wherein the total required braking quantity determining operation includes a second braking pattern analyzing operation, by the controller, in which when it is determined that a traveling distance of the vehicle in a state where the total required braking quantity is determined is equal to or larger than a predetermined distance, an accumulated general hydraulic pressure braking quantity according to the travelling distance equal to or larger than the predetermined distance is compared with a predetermined second hydraulic pressure braking quantity.

2. The method of claim 1, wherein the accumulated correction hydraulic pressure braking quantity is a hydraulic pressure braking quantity under a braking condition, in which the regenerative braking of the motor is restricted and only the hydraulic pressure braking is performed.

3. The method of claim 1, wherein in the total required braking quantity determining operation, when the accumulated correction hydraulic pressure braking quantity is larger than the first hydraulic pressure braking quantity, it is determined that the driver has a normal braking pattern, and the accumulated correction hydraulic pressure braking quantity according to a travelling distance is initialized, an operation mode of the vehicle enters a general mode, and a total required braking quantity is determined.

4. The method of claim 3, further comprising:
   a regenerative braking allowance quantity receiving operation, by the controller, of receiving an allowance quantity according to a requested quantity of the regenerative braking of the motor to determine the total required braking quantity in the general mode,
   wherein in the general mode, the hydraulic pressure braking is performed based on the total required braking quantity determined based on a sum of the requested quantity of the regenerative braking of the motor and a general hydraulic pressure braking quantity detected according to a braking quantity.

5. The method of claim 1, wherein the accumulated general hydraulic pressure braking quantity is a hydraulic pressure braking quantity under a braking condition, in which the regenerative braking of the motor and the hydraulic pressure braking are performed together.

6. The method of claim 1, wherein in the second braking pattern analyzing operation, when the accumulated general hydraulic pressure braking quantity is larger than the second hydraulic pressure braking quantity, it is determined that the driver has a gradual braking-centered braking pattern, and the regenerative braking restriction requesting operation and the hydraulic pressure braking operation are sequentially performed.

7. The method of claim 1, wherein in the second braking pattern analyzing operation, when the accumulated general hydraulic pressure braking quantity is smaller than the predetermined second hydraulic pressure braking quantity, it is determined that the driver has the normal braking pattern and the operation mode of the vehicle enters the general mode.

* * * * *